(12) United States Patent
Zhang

(10) Patent No.: US 11,415,847 B2
(45) Date of Patent: Aug. 16, 2022

(54) DISPLAY PANEL AND MANUFACTURING METHOD THEREOF

(71) Applicant: Shenzhen China Star Optoelectronics Semiconductor Display Technology Co., Ltd., Shenzhen (CN)

(72) Inventor: Yihe Zhang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 200 days.

(21) Appl. No.: 16/649,708

(22) PCT Filed: Mar. 13, 2020

(86) PCT No.: PCT/CN2020/079251
§ 371 (c)(1),
(2) Date: Mar. 23, 2020

(87) PCT Pub. No.: WO2021/114503
PCT Pub. Date: Jun. 17, 2021

(65) Prior Publication Data
US 2021/0405408 A1    Dec. 30, 2021

(30) Foreign Application Priority Data

Dec. 12, 2019  (CN) .......................... 201911276012.6

(51) Int. Cl.
*G02F 1/1362*  (2006.01)
*G02F 1/1368*  (2006.01)

(52) U.S. Cl.
CPC .. *G02F 1/136209* (2013.01); *G02F 1/136222* (2021.01); *G02F 1/1368* (2013.01); *G02F 1/136286* (2013.01)

(58) Field of Classification Search
CPC ............ G02F 1/1368; G02F 1/136209; G02F 1/136286
See application file for complete search history.

(56) References Cited

U.S. PATENT DOCUMENTS

| 10,345,660 | B1 | 7/2019 | Cao | |
| 10,481,425 | B2* | 11/2019 | Hwang | ............ G02F 1/133514 |
| 10,634,958 | B1* | 4/2020 | Deng | ................ G02F 1/136209 |
| 2019/0027514 | A1* | 1/2019 | Liu | ..................... H01L 27/1248 |

FOREIGN PATENT DOCUMENTS

| CN | 207780438 | 8/2018 |
| CN | 108535909 | 9/2018 |
| JP | 07-318950 | 12/1995 |
| WO | WO2019/200819 | * 9/2018 |

* cited by examiner

*Primary Examiner* — Dung T Nguyen

(57) ABSTRACT

A display panel and a method of manufacturing the same are disclosed. The display panel comprises an upper substrate and a lower substrate disposed opposite to each other, a TFT layer is disposed on a side of the lower substrate away from the upper substrate, a color resist layer is disposed on a side of the TFT layer away from the lower substrate, an isolating layer and a black matrix are disposed on a side of the color resist layer away from the TFT layer, and the isolating layer and the BM are an integrally formed structure.

14 Claims, 2 Drawing Sheets

DISPLAY PANEL AND MANUFACTURING METHOD THEREOF

RELATED APPLICATIONS

This application is a National Phase of PCT Patent Application No. PCT/CN2020/079251 having International filing date of Mar. 13, 2020, which claims the benefit of priority of Chinese Patent Application No. 201911276012.6 filed on Dec. 12, 2019. The contents of the above applications are all incorporated by reference as if fully set forth herein in their entirety.

FIELD AND BACKGROUND OF THE INVENTION

The present application relates to the field of display panel technology, and particularly to a display panel and a method of manufacturing the same.

With development of display technology, flexible display panels or curved display panels have become a development trend of the field, and have been used in various kinds of electronic equipment. Photo spacers (PS) in an existing curved display panel are for supporting an upper substrate and a lower substrate of the curved display panel. The PS usually have two or more different heights, including a main isolating pillar in contact with both the upper substrate and the lower substrate and compressed to a certain extent, and a sub-isolating pillar for providing support under an external pressure and not compressed in a normal state. Besides, a black matrix (BM) of the existing display panel is generally disposed on the upper substrate to prevent light leakage caused by liquid crystals around gate lines and data lines of the display panel.

The existing BM disposed on the upper substrate of the display panel and the PS have to be formed in two different processes, and disposing the BM on the upper substrate will easily cause the BM to shift in the curved display panel having a large displacement between the upper substrate and the lower substrate, and further cause light leakage and color shift.

SUMMARY OF THE INVENTION

Embodiments of the present application provide a display panel and a method of manufacturing the same, to solve a problem of light leakage or color shift caused by the BM disposed on the upper substrate shifting in curved display panel having a large displacement between the upper substrate and the lower substrate, and a problem that the BM and the PS have been formed in two different processes.

The embodiments of the present application provide a display panel, comprising:
an upper substrate; and
a lower substrate disposed opposite to the upper substrate;
a thin film transistor (TFT) layer disposed on a side of the lower substrate close to the upper substrate;
a color resist layer disposed on a side of the TFT layer away from the lower substrate;
an isolating layer disposed on a side of the color resist layer away from the TFT layer; and
a black matrix (BM) disposed on the side of the color resist layer away from the TFT layer;
wherein the isolating layer and the BM are an integrally formed structure.
The color resist layer comprises:
a color resist stage corresponding to the isolating layer and protruding toward the upper substrate;
the isolating layer comprises:
a main isolating pillar; and
a sub-isolating pillar;
wherein a thickness of a color resist stage corresponding to the main isolating pillar is greater than a thickness of a color resist stage corresponding to the sub-isolating pillar.

The color resist stage comprises stacking color resists having two different colors.

A color resist of a color resist stage on a side close to the TFT layer is a first color resist or a second color resist, a color resist of the color resist stage corresponding to the main isolating pillar on a side away from the TFT layer is a third color resist, a color resist of the color resist stage corresponding to the sub-isolating pillar on a side away from the TFT layer is the second color resist or the first color resist with a color different from that of the second color resist, a thickness of the third color resist is greater than a thickness of the first color resist, and the thickness of the third color resist is greater than a thickness of the second color resist.

The first color resist is a green color resist, the second color resist is a red color resist, and the third color resist is a blue color resist.

The first color resist is a red color resist, the second color resist is a green color resist, and the third color resist is a blue color resist.

A difference value between the thickness of the color resist stage corresponding to the main isolating pillar and the thickness of the color resist stage corresponding to the sub-isolating pillar ranges between 0.19 um and 0.21 um.

The TFT layer comprises a protruding stage corresponding to the isolating layer, and a thickness of a protruding stage corresponding to the main isolating pillar is greater than a thickness of a protruding stage corresponding to the sub-isolating pillar.

The TFT layer comprises:
a first metal layer disposed on the lower substrate;
a first insulating layer disposed on the first metal layer and the lower substrate and covering the first metal layer;
an active layer disposed on the first insulating layer;
a second metal layer disposed on the active layer; and
a second insulating layer disposed on the first insulating layer and the second metal layer and covering the second metal layer;
wherein the protruding stage corresponding to the main isolating pillar is constituted of the first metal layer, the first insulating layer, the active layer, the second metal layer, and the second insulating layer sequentially stacked, and the protruding stage corresponding to the sub-isolating pillar is constituted of the first metal layer, the first insulating layer, and the second insulating layer sequentially stacked.

The first metal layer comprises:
a gate electrode; and
a gate line connected to the gate electrode;
wherein the first metal layer of the protruding stage corresponding to the main isolating pillar is the gate electrode, and the first metal layer of the protruding stage corresponding to the sub-isolating pillar is a part of the gate line.

A difference value between the thickness of the protruding stage corresponding to the main isolating pillar and the thickness of the protruding stage corresponding to the sub-isolating pillar ranges between 0.3 um and 0.5 um.

The embodiments of the present application also provide a method of manufacturing a display panel, comprising following steps:

providing an upper substrate and a lower substrate, and forming a thin film transistor (TFT) layer on the lower substrate;

forming a color resist layer on a side of the TFT layer away from the lower substrate;

forming an isolating layer and a black matrix (BM) on a side of the color resist layer away from the TFT layer, wherein the isolating layer and the BM are integrally formed by a same process; and aligning and combining the upper substrate and the lower substrate, wherein the upper substrate is disposed on a side of the isolating layer away from the lower substrate and disposed opposite to the lower substrate.

The color resist layer at least comprises a color resist stage disposed on the TFT layer, and the color resist stage comprises stacking color resists having two different colors.

The isolating layer is disposed on a side of the color resist stage away from the TFT layer.

The isolating layer and the BM are integrally formed by a same exposing and developing process.

The color resist layer is formed by ink-jet printing.

The present application provides a display panel and a method of manufacturing the same. By disposing a BM on a lower substrate, problems of light leakage and color shift caused by the BM shifting in a curved display panel are prevented. Meanwhile, by setting an isolating layer and the BM as an integrally formed structure and adopting one manufacturing process to form the isolating layer and the BM, the manufacturing process is simplified, equipment and masks are saved, product yield is increased, and original functions of the isolating layer and the BM are unaffected.

DESCRIPTION OF SPECIFIC EMBODIMENTS OF THE INVENTION

Figure 1:
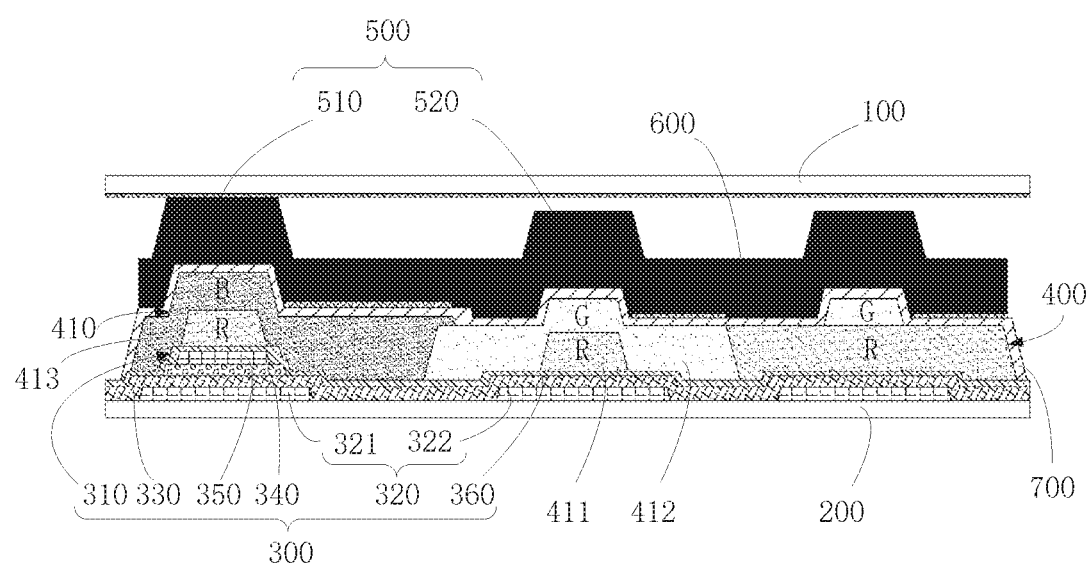
FIG. 1 is a structural schematic diagram of a display panel provided in an embodiment of the present application.

Following will illustrate a technical solution of the embodiments of the present application clearly and completely with figures of the embodiments of the present application. Obviously, the embodiments described herein are only a part of, but not all of, embodiments the present application may include. All other embodiments attained by those skilled in the art basing on the embodiments of the present application without inventive work are within the protection scope of the present application.

In the present application, terms such as 'center', 'longitudinal', 'transverse', 'length', 'width', 'thickness', 'up', 'down', 'front', 'back', 'left', 'right', 'vertical', 'horizontal', 'top', 'bottom', 'internal', 'external', 'clockwise', 'anti-clockwise' and so on are instructing an orientation or a position relationship based on an orientation or a position relationship shown in the figures, which are for simplifying the description of the present invention only, but are not instructing or implying that a device or a component must include a specific orientation, or a constitution or operation in a specific orientation, and therefore it should not be understood as a limitation to the present application. Besides, terms such as 'first', 'second' are for describing purpose, and they can neither be understood as instructing or implying a relative importance, nor be understood as instructing a quantity of technical characteristics. Therefore, characteristics defined with 'first', 'second' can include one or more of characteristics either explicitly or implicitly. In the present application, a term such as 'a plurality of' means two or more than two, except that it is defined explicitly and specifically.

In the present application, terms such as 'fixing', 'connecting' should be understood broadly, for example, 'connecting' means connecting fixedly or removably, or connecting as a whole, or connecting in a mechanical way or an electrical way, or connecting by communicating with each other, or connecting directly or indirectly via a medium, or connecting internally between two components, or connecting by functioning with each other between two components. Those skilled in the art should reach a meaning the terms may include in the present application according to a practical situation.

In the present application, a first characteristic locates on or under a second characteristic includes a meaning that the first characteristic and the second characteristic contact directly, or that the first characteristic and the second characteristic contact via another characteristic between them. And the first characteristic locates on or over or above the second characteristic includes a meaning that the first characteristic locates on or over or above the second characteristic direct upward or inclined upward, or that the first characteristic locates higher than the second characteristic. And the first characteristic locates under or below the second characteristic includes that the first characteristic locates under or below the second characteristic direct downward or inclined downward, or that the first characteristic locates lower than the second characteristic.

Following disclosure provides various embodiments or examples. In order to simplify the description of the present application, following will describe components and settings in specific examples. Of course, they are for illustrating only and should not be considered as a limitation to the present application. Besides, reference numbers and/or reference letters repeated in different embodiments of the present application are for a simplified and clear describing purpose, which do not instruct a relationship between embodiments or setting discussed herein. And those skilled in the art can reach an idea of applications of other process or use of other material according to various specific examples of process and material provided in the present application.

Following will describe the present application with figures and embodiments.

As shown in FIG. 1, an embodiment of the present application provides a display panel comprising an upper substrate 100 and a lower substrate 200 disposed opposite to each other. A thin film transistor (TFT) layer 300 is disposed on a side of the lower substrate 200 close to the upper substrate 100, a color resist layer 400 is disposed on a side of the TFT layer 300 away from the lower substrate 200, an isolating layer 500 and a black matrix (BM) 600 are disposed on a side of the color resist layer 400 away from the TFT layer 300, and the isolating layer 500 and the BM 600 are an integrally formed structure.

The BM and PS have to be formed in two different processes in an existing curved display panel, and disposing the BM on the upper substrate 100 will easily cause the BM to shift in the curved display panel having a large displacement between the upper substrate 100 and the lower substrate 200 and further cause light leakage and color shift. In the present application, the color resist 400 and the BM 600 are all disposed on the lower substrate 200, a relative position between the color resist 400 and the BM 600 does not change according to changes in a relative position between the upper substrate 100 and the lower substrate 200, thereby reducing a risk of light leakage or color shift of the display panel, simplifying a manufacturing process of the display panel as the isolating layer 500 and the BM 600 are configured as the integrally formed structure, and increasing manufacturing efficiency. Materials of the isolating layer 500 and the BM 600 are all black photoresist materials. In addition, FIG. 1 only shows a structure of a part of a non-display area of the display panel corresponding to the isolating layer 500 and the BM 600, whereas a structure of a display area of the display panel corresponding to the BM 600 is not shown.

In one embodiment, the color resist layer 400 comprises color resist stages 410 corresponding to the isolating layer 500 and protruding toward the upper substrate 100, the isolating layer 500 comprises a main isolating pillar 510 and a sub-isolating pillar 520, a thickness of a color resist stage 410 corresponding to the main isolating pillar 510 is greater than that of a color resist stage 410 corresponding to the sub-isolating pillar 520. By differentiating the thickness of the color resist stages 410 corresponding to the main isolating pillar 510 and the sub-isolating pillar 520, a height difference between the main isolating pillar 510 and the sub-isolating pillar 520 is fulfilled conveniently, and the main isolating pillar 510 is compressed to a certain extent when contacting with the upper substrate 100, whereas the sub-isolating pillar 520 is not compressed in a normal state and supports the upper substrate 100 under an external pressure.

In one embodiment, the color resist stage 410 comprises stacking color resists having two different colors. A color resist of the color resist stage 410 corresponding to the main isolating pillar 510 on a side away from the TFT layer 300 is a third color resist. Color resists of the color resist stage 410 corresponding to the sub-isolating pillar 520 on a side away from the TFT layer 300 are the second color resist 412 and the first color resist 411 with a color different from that of the second color resist. A thickness of the third color resist 413 is greater than a thickness of the first color resist 411, and a thickness of the third color resist 413 is greater than a thickness of the second color resist 412. By setting the color resist stage 410 as a structure with stacking color resists having two different colors, a height of the isolating layer 500 is increased, and by setting the thickness of the third color resist 413 corresponding to the main isolating pillar 510 greater than the thickness of the first color resist 411 and the thickness of the second color resist 412, a height difference between the main isolating pillar 510 and the sub-isolating pillar is fulfilled.

The first color resist 411 and the second color resist 412 are any combination of a red color resist and a green color resist; namely, in a double layer color resist structure of the color resist stage 410, a color resist for increasing height of the color resist stage 410 can be the green color resist or the red color resist, and the third color resist 413 corresponding to the main isolating pillar 510 is a blue color resist. In a manufacturing process of existing color resists, a height of the blue color resist is generally required to be greater than a height of the green color resist or the red color resist, such that a thickness of the color resist stage 410 corresponding to the main isolating pillar 510 is greater than a thickness of the color resist stage 410 corresponding to the sub-isolating pillar 520. A height difference between the blue color resist and the green color resist or the red color resist ranges between 0.19 um and 0.21 um, such that a difference value between the thickness of the color resist stage 410 corresponding to the main isolating pillar 510 and the thickness of the color resist stage 410 corresponding to the sub-isolating pillar 520 ranges between 0.19 um and 0.21 um. In one embodiment, a height difference between the blue color resist and the green color resist or the red color resist can be 0.2 um. In the present application, a thicker blue color resist is disposed in the color resist stage 410 corresponding to the main isolating pillar 510 without changing existing structures of other components, a height difference between the main isolating pillar 510 and the sub-isolating pillar 520 is fulfilled, and an impact on the structure and manufacturing process of the existing display panel is minimized.

In one embodiment, the TFT layer 300 comprises a protruding stage 310 corresponding to the isolating layer 500. A thickness of a protruding stage 310 corresponding to the main isolating pillar 510 is greater than a thickness of a protruding stage 310 corresponding to the sub-isolating pillar 520. As mentioned above, by differentiating the thicknesses of the protruding stages 310 corresponding to the main isolating pillar 510 and the sub-isolating pillar 520 to fulfill the height difference between the main isolating pillar 510 and the sub-isolating pillar 520, supporting functions of the main isolating pillar 510 and the sub-isolating pillar 520 can be fulfilled, respectively.

In one embodiment, the TFT layer 300 comprises a first metal layer 320 disposed on the lower substrate 200; a first insulating layer 330 disposed on the first metal layer 320 and the lower substrate 200, and covering the first metal layer 320; an active layer 340 disposed on the first insulating layer 330; a second metal layer 350 disposed on the active layer 340; and a second insulating layer 360 disposed on the first insulating layer 330 and the second metal layer 350, and covering the second metal layer 350. The protruding stage 310 corresponding to the main isolating pillar 510 is constituted of the first metal layer 320, the first insulating layer 330, the active layer 340, the second metal layer 350, and the second insulating layer 360 sequentially stacked. The protruding stage 310 corresponding to the sub-isolating pillar 520 is constituted of the first metal layer 320, the first insulating layer 330, and the second insulating layer 360 sequentially stacked. Compared with the structure of the protruding stage 310 corresponding to the sub-isolating pillar 520 comprising having the first metal layer 320, the first insulating layer 330, and the second insulating layer 360; the active layer 340 and the second metal layer 350 are added to the protruding stage 310 corresponding to the main isolating pillar 510 having the first metal layer 320, the first insulating layer 330, the active layer 340, the second metal layer 350, and the second insulating layer 360. The first metal layer 320, the first insulating layer 330, the active layer 340, the second metal layer 350, and the second insulating layer 360 are all normal components of the TFF layer 300. The first metal layer 320 comprises a gate electrode 321, and a gate line 322 connected to the gate electrode 321. A first metal layer of the protruding stage 310 corresponding to the main isolating pillar 510 is the gate electrode 321. A first metal layer of the protruding stage 310 corresponding to the sub-isolating pillar 520 is a part of the gate line 322. The gate line 322 comprises a metal line or a single metal layer of a storage capacitance. A thickness of the gate electrode 321 is greater than a thickness of the gate line 322. According to the structural differences between the above two types of protruding stage 310 and the requirements of existing TFT manufacturing process, a difference value between the thickness of the protruding stage 310 corresponding to the main isolating pillar 510 and the thickness of the protruding stage 310 corresponding to the sub-isolating pillar 520 ranges between 0.3 um and 0.5 um.

By disposing the main isolating pillar 510 on a protruding stage 310 located at a higher position of the TFT layer 300 corresponding to the gate electrode 321, and by disposing the sub-isolating pillar 520 on a protruding stage 310 located at a lower position of the TFT layer 300 corresponding to the gate line 322, heights of the main isolating pillar 310 and the sub-isolating pillar are differentiated. By disposing the isolating layer 500 on the protruding stage 310 located at a relative higher position of the TFT layer 300, a structure of the TFT layer 300 is not affected, a height of the isolating layer 500 is raised, and heights of the main isolating pillar 510 and the sub-isolating pillar 520 are differentiated.

An overall height of the isolating layer 500 is raised by the protruding stage 310 and the color resist stage 410, and the heights of the main isolating pillar 510 and the sub-isolating pillar 520 are differentiated by adjusting positions of the main isolating pillar 510 and the sub-isolating pillar 520 based on different heights among protruding stages 310 and different heights among color resist stages 410. As shown in FIG. 1, during the process of integrally forming the BM 600 and the isolating layer 500, the BM 600 and the isolating layer 500 are formed by coating black photoresist materials, and then exposing and developing the black photoresist materials. Differentiated exposure (such as half-tone mask) is not needed to form the BM 600 and the isolating layer 500. Thicknesses of all parts of the BM 600 and the isolating layer 500 are equal if a leveling effect of materials during the production process is not considered.

In one embodiment, as shown in FIG. 1, portions corresponding to the color resist layer 400 and the BM 600 are single layered color resist structures, and, though the color resist stage 410 is designed as a double layered color resist structure, the manufacturing process of the color resist layer 400 is not affected. What is needed is just changing a structure of a mask used in the manufacturing process of the color resist. Besides, a third insulating layer 700 is disposed on a side of the color resist layer 400 close to the BM 600. ITO electrodes are disposed between the third insulating layer 700 and the BM 600, and disposed on a side of the upper substrate 100 close to the lower substrate 200. Material of the third insulating layer 700 is SiNx.

In conclusion, by disposing the BM 600 on the lower substrate 200, problems of light leakage and color shift caused by the BM 600 shifting in the curved display panel are prevented, and by setting the isolating layer 500 and the BM 600 as an integrally formed structure, the manufacturing process is simplified and the material cost is reduced.

Figure 2:
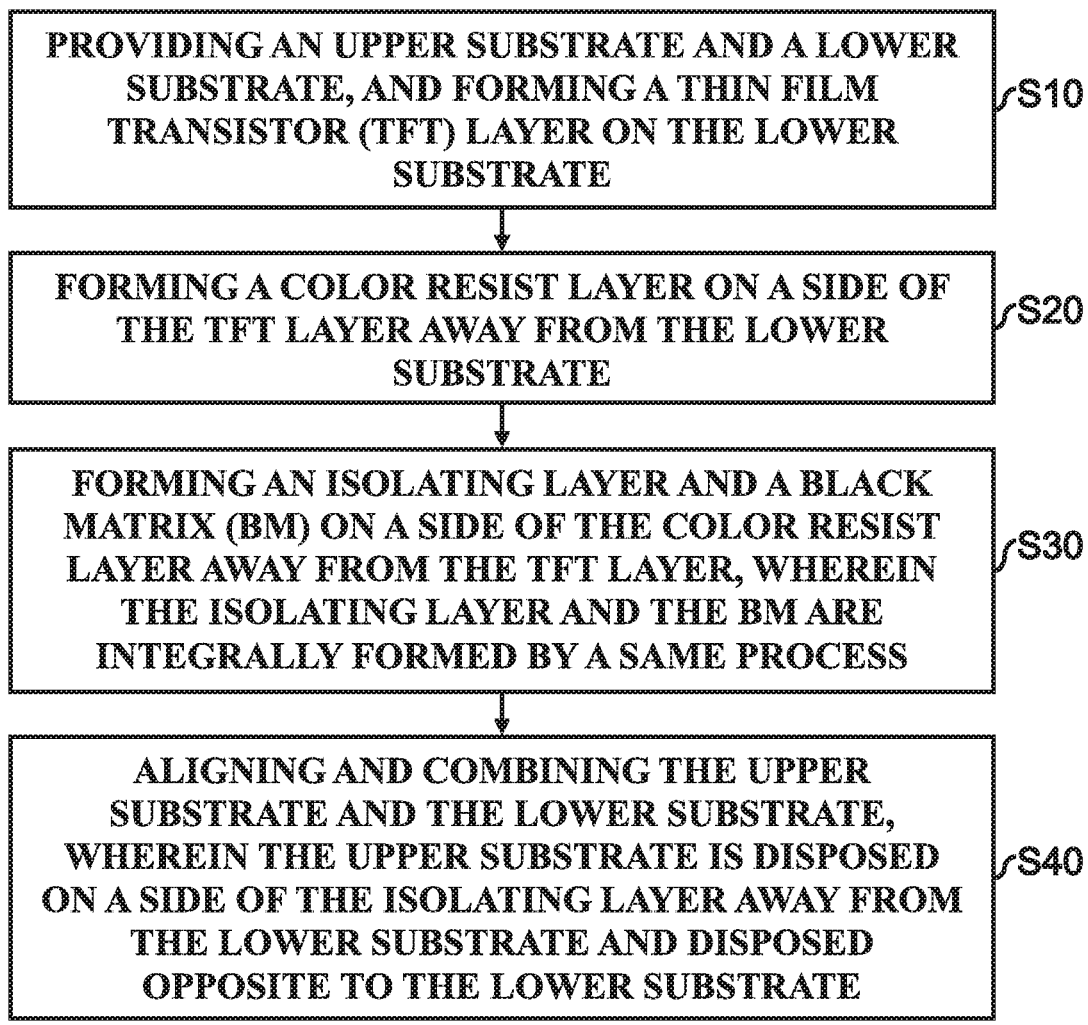
FIG. 2 is a flow chart of a method for manufacturing a display panel provided in an embodiment of the present application.

An embodiment of the present application also provides a method of manufacturing a display panel, as shown in FIG. 2, comprising following steps:

Step S10: providing an upper substrate 100 and a lower substrate 200, and forming a thin film transistor (TFT) layer 300 on the lower substrate 200;

Step S20: forming a color resist layer 400 on a side of the TFT layer 300 away from the lower substrate 200;

Step S30: forming an isolating layer 500 and a BM 600 on a side of the color resist layer 400 away from the TFT layer 300, the isolating layer 500 and the BM 600 are integrally formed by a same process; and Step S40: aligning and combining the upper substrate 100 and the lower substrate 200, the upper substrate 100 is disposed on a side of the isolating layer 500 away from the lower substrate 200, and disposed opposite to the lower substrate 200.

During the specific manufacturing process, the TFT layer 300, the color resist layer 400, the isolating layer 500, and the BM 600 are provided in sequence on the lower substrate 200, and then the upper substrate 100 is aligned and combined with the lower substrate 200 equipped with all necessary functional layers.

In one embodiment, in the step S20, the color resist layer 400 formed on the side of the TFT layer 300 away from the lower substrate 200 at least comprises a color resist stage 410 disposed on the TFT layer 300, the color resist stage 410 comprises stacking color resists having two different colors.

In the step S30, the isolating layer 500 is disposed on the side of the color resist layer 400 away from the TFT layer 300.

Specifically, the isolating layer 500 and the BM 600 are integrally formed by a same exposing and developing process, and the color resist layer 400 is formed by ink-jet printing.

In conclusion, by disposing the BM 600 on the lower substrate 200 in the present application, problems of light leakage and color shift caused by the BM 600 shifting in the curved display panel are prevented. Meanwhile, by setting the isolating layer 500 and the BM 600 as an integrally formed structure and adopting one manufacturing process to form the isolating layer 500 and the BM 600, the manufacturing process is simplified, masks are saved, product yield is increased, and original functions of the isolating layer 500 and the BM 600 are unaffected.

Each embodiment mentioned above may focus on different aspects, therefore, a detailed description of one embodiment can be viewed as an illustration for a brief description of others.

The embodiments of the present invention are described above in detail, and specific examples are used to illustrate principle and implementation of the present application, the descriptions of above mentioned embodiments are used for making a technical solution and the core idea of the present application better understood. Those skilled in the art should understand that they can either vary the technical solution described in the above mentioned embodiments, or substitute part of the technical characteristics. However, these variations or substitutions are still within the protection scope of the present application.

What is claimed is:

1. A display panel, comprising:
an upper substrate; and
a lower substrate disposed opposite to the upper substrate;
a thin film transistor (TFT) layer disposed on a side of the lower substrate close to the upper substrate;
a color resist layer disposed on a side of the TFT layer away from the lower substrate;
an isolating layer disposed on a side of the color resist layer away from the TFT layer; and
a black matrix (BM) disposed on the side of the color resist layer away from the TFT layer;
wherein the isolating layer and the BM are an integrally formed structure;
wherein the color resist layer comprises color resist stages corresponding to the isolating layer and protruding toward the upper substrate; the isolating layer comprises a main isolating pillar, and a sub-isolating pillar;
wherein a thickness of a color resist stage corresponding to the main isolating pillar is greater than a thickness of a color resist stage corresponding to the sub-isolating pillar;
wherein a difference value between the thickness of the color resist stage corresponding to the main isolating pillar and the thickness of the color resist stage corresponding to the sub-isolating pillar ranges between 0.19 um and 0.21 um.

2. The display panel of claim 1, wherein the color resist stage comprises stacking color resists having two different colors.

3. The display panel of claim 2, wherein a color resist of a color resist stage on a side close to the TFT layer is a first color resist or a second color resist, a color resist of the color resist stage corresponding to the main isolating pillar on a side away from the TFT layer is a third color resist, a color resist of the color resist stage corresponding to the sub-isolating pillar on a side away from the TFT layer is the second color resist or the first color resist with a color different from that of the second color resist, a thickness of the third color resist is greater than a thickness of the first color resist, and the thickness of the third color resist is greater than a thickness of the second color resist.

4. The display panel of claim 3, wherein the first color resist is a green color resist, the second color resist is a red color resist, and the third color resist is a blue color resist.

5. The display panel of claim 3, wherein the first color resist is a red color resist, the second color resist is a green color resist, and the third color resist is a blue color resist.

6. The display panel of claim 1, wherein the TFT layer comprises a protruding stage corresponding to the isolating layer, and a thickness of a protruding stage corresponding to the main isolating pillar is greater than a thickness of a protruding stage corresponding to the sub-isolating pillar.

7. The display panel of claim 6, wherein the TFT layer comprises:
    a first metal layer disposed on the lower substrate;
    a first insulating layer disposed on the first metal layer and the lower substrate and covering the first metal layer;
    an active layer disposed on the first insulating layer;
    a second metal layer disposed on the active layer; and
    a second insulating layer disposed on the first insulating layer and the second metal layer and covering the second metal layer;
    wherein the protruding stage corresponding to the main isolating pillar is constituted of the first metal layer, the first insulating layer, the active layer, the second metal layer, and the second insulating layer sequentially stacked, and the protruding stage corresponding to the sub-isolating pillar is constituted of the first metal layer, the first insulating layer, and the second insulating layer sequentially stacked.

8. The display panel of claim 7, wherein the first metal layer comprises:
    a gate electrode; and
    a gate line connected to the gate electrode;
    wherein the first metal layer of the protruding stage corresponding to the main isolating pillar is the gate electrode, and the first metal layer of the protruding stage corresponding to the sub-isolating pillar is a part of the gate line.

9. The display panel of claim 6, wherein a difference value between the thickness of the protruding stage corresponding to the main isolating pillar and the thickness of the protruding stage corresponding to the sub-isolating pillar ranges between 0.3 um and 0.5 um.

10. A method of manufacturing a display panel, comprising following steps:
    providing an upper substrate and a lower substrate, and forming a thin film transistor (TFT) layer on the lower substrate;
    forming a color resist layer on a side of the TFT layer away from the lower substrate;
    forming an isolating layer and a black matrix (BM) on a side of the color resist layer away from the TFT layer, wherein the isolating layer and the BM are integrally formed by a same process; and
    aligning and combining the upper substrate and the lower substrate, wherein the upper substrate is disposed on a side of the isolating layer away from the lower substrate and disposed opposite to the lower substrate;
    wherein the color resist layer comprises color resist stages corresponding to the isolating layer and protruding toward the upper substrate; the isolating layer comprises a main isolating pillar, and a sub-isolating pillar;
    wherein a thickness of a color resist stage corresponding to the main isolating pillar is greater than a thickness of a color resist stage corresponding to the sub-isolating pillar;
    wherein a difference value between the thickness of the color resist stage corresponding to the main isolating pillar and the thickness of the color resist stage corresponding to the sub-isolating pillar ranges between 0.19 um and 0.21 um.

11. The method of claim 10, wherein the color resist stage comprises stacking color resists having two different colors.

12. The method of claim 11, wherein the isolating layer is disposed on a side of the color resist stage away from the TFT layer.

13. The method of claim 10, wherein the isolating layer and the BM are integrally formed by a same exposing and developing process.

14. The method of claim 10, wherein the color resist layer is formed by ink-jet printing.

* * * * *